(12) United States Patent
Shi et al.

(10) Patent No.: US 12,248,219 B2
(45) Date of Patent: Mar. 11, 2025

(54) ELECTRIC DEVICE

(71) Applicant: InnoLux Corporation, Miao-Li County (TW)

(72) Inventors: Zong-Bai Shi, Miao-Li County (TW); Hsiu-Tung Lin, Miao-Li County (TW); Chung-Wen Yen, Miao-Li County (TW); Wen-Bin Hung, Miao-Li County (TW); Yi-Pin Jhan, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/470,564

(22) Filed: Sep. 20, 2023

(65) Prior Publication Data

US 2024/0004241 A1 Jan. 4, 2024

Related U.S. Application Data

(63) Continuation of application No. 18/171,513, filed on Feb. 20, 2023, now Pat. No. 11,796,864.

(30) Foreign Application Priority Data

Mar. 17, 2022 (CN) .......................... 202210263474.X

(51) Int. Cl.
*G02F 1/1339* (2006.01)
*G02F 1/1335* (2006.01)

(52) U.S. Cl.
CPC ...... *G02F 1/1339* (2013.01); *G02F 1/133512* (2013.01); *G02F 1/133514* (2013.01)

(58) Field of Classification Search
CPC .................................................... G02F 1/1339
See application file for complete search history.

(56) References Cited

U.S. PATENT DOCUMENTS

| 7,924,350 B2 | 4/2011 | Ma |
| 2009/0273746 A1* | 11/2009 | Uehara ............. G02F 1/133555 349/106 |

(Continued)

FOREIGN PATENT DOCUMENTS

TW 200916896 A 4/2009

OTHER PUBLICATIONS

Chinese language office action dated Sep. 24, 2024, issued in application No. TW 111138363.

*Primary Examiner* — Edmond C Lau
(74) *Attorney, Agent, or Firm* — McClure, Qualey & Rodack, LLP

(57) ABSTRACT

An electronic device includes a substrate, an organic layer, a first insulating layer, and a first spacer. The organic layer is disposed on the substrate and includes a first opening and a second opening. The first insulating layer includes a first portion in the first opening and a second portion connected to the first portion and on the organic layer. The first spacer is disposed on the substrate and overlaps the second portion. In a top view of the electronic device, the second portion between the first opening and the second opening has a first length, the first spacer has a second length, the organic layer between the first opening and the second opening has a third length. The first length is greater than or equal to the second length and less than or equal to the third length.

15 Claims, 10 Drawing Sheets

(56) References Cited

U.S. PATENT DOCUMENTS

| | | | |
|---|---|---|---|
| 2011/0069258 A1* | 3/2011 | Joo | G02F 1/13394 349/187 |
| 2018/0088409 A1* | 3/2018 | Lee | H10K 71/50 |
| 2018/0143500 A1* | 5/2018 | Yu | G02F 1/136227 |

* cited by examiner

ELECTRIC DEVICE

CROSS REFERENCE TO RELATED APPLICATIONS

This application is a Continuation of pending U.S. patent application Ser. No. 18/171,513, filed on Feb. 20, 2023, which claims priority of China Patent Application No. 202210263474.X, filed on Mar. 17, 2022, the entirety of which is incorporated by reference herein.

BACKGROUND OF THE INVENTION

Field of the Invention

The present invention relates to an optical structure and an electric device comprising the same, and, in particular, to an optical structure comprising a light filter layer and an electric device comprising the same.

Description of the Related Art

A spacer (PS) is usually provided in a liquid-crystal device to control the liquid-crystal gap in the liquid-crystal device. However, in cases where sub-pixels are arranged in an island type of arrangement or a mosaic type of arrangement, the spacer will be disposed on the light shielding layer, or it may be disposed on the insulating layer that is between two sub-pixels, or it may be disposed on both. The height and size of the spacer must be increased to control the liquid-crystal gap in the liquid-crystal device. However, increasing the height and size of the spacer will increase the size of the area that is in the wrong orientation (or it is in a bad orientation) in the liquid-crystal device. It may also reduce the size of the opening area, reduce the light transmittance, and reduce the opening ratio; any or all of which will affect the quality of the electric device.

BRIEF SUMMARY OF THE INVENTION

The present disclosure provides an optical structure and an electric device comprising the same. The optical structure has a larger opening area, better light transmittance, or both. The electric device comprising the same will have a higher opening ratio, better display quality, or both.

An embodiment of the present invention provides an optical structure. The optical structure comprises a substrate; a light shielding layer disposed on the substrate and comprising a first opening; a light filter layer comprising a first portion and a second portion arranged in a first direction, wherein the first portion is disposed in the first opening, and the second portion connects to the first portion and is disposed on the light shielding layer; and a first spacer disposed on the second portion. In a top view of the optical structure, a first virtual line crosses a center of the first spacer and extends in the first direction, the second portion has a first length, the first spacer has a second length, the light shielding layer has a third length, the first length, the second length and the third length are measured along the first virtual line, and the first length is greater than or equal to the second length and less than or equal to the third length.

An embodiment of the present invention provides an electric device comprising an array structure and an optical structure. The optical structure comprises a first substrate; a light shielding layer disposed on the first substrate and comprising a first opening; a light filter layer comprising a first portion and a second portion arranged in a first direction, wherein the first portion is disposed in the first opening, and the second portion connects to the first portion and is disposed on the light shielding layer; and a first spacer disposed on the second portion. In a top view of the optical structure, a first virtual line crosses a center of the first spacer and extends in the first direction, the second portion has a first length, the first spacer has a second length, the light shielding layer has a third length, the first length, the second length and the third length are measured along the first virtual line, and the first length is greater than or equal to the second length and less than or equal to the third length.

BRIEF DESCRIPTION OF THE DRAWINGS

The present invention can be more fully understood by reading the subsequent detailed description and examples with references made to the accompanying drawings.

DETAILED DESCRIPTION OF THE INVENTION

Figure 1A:
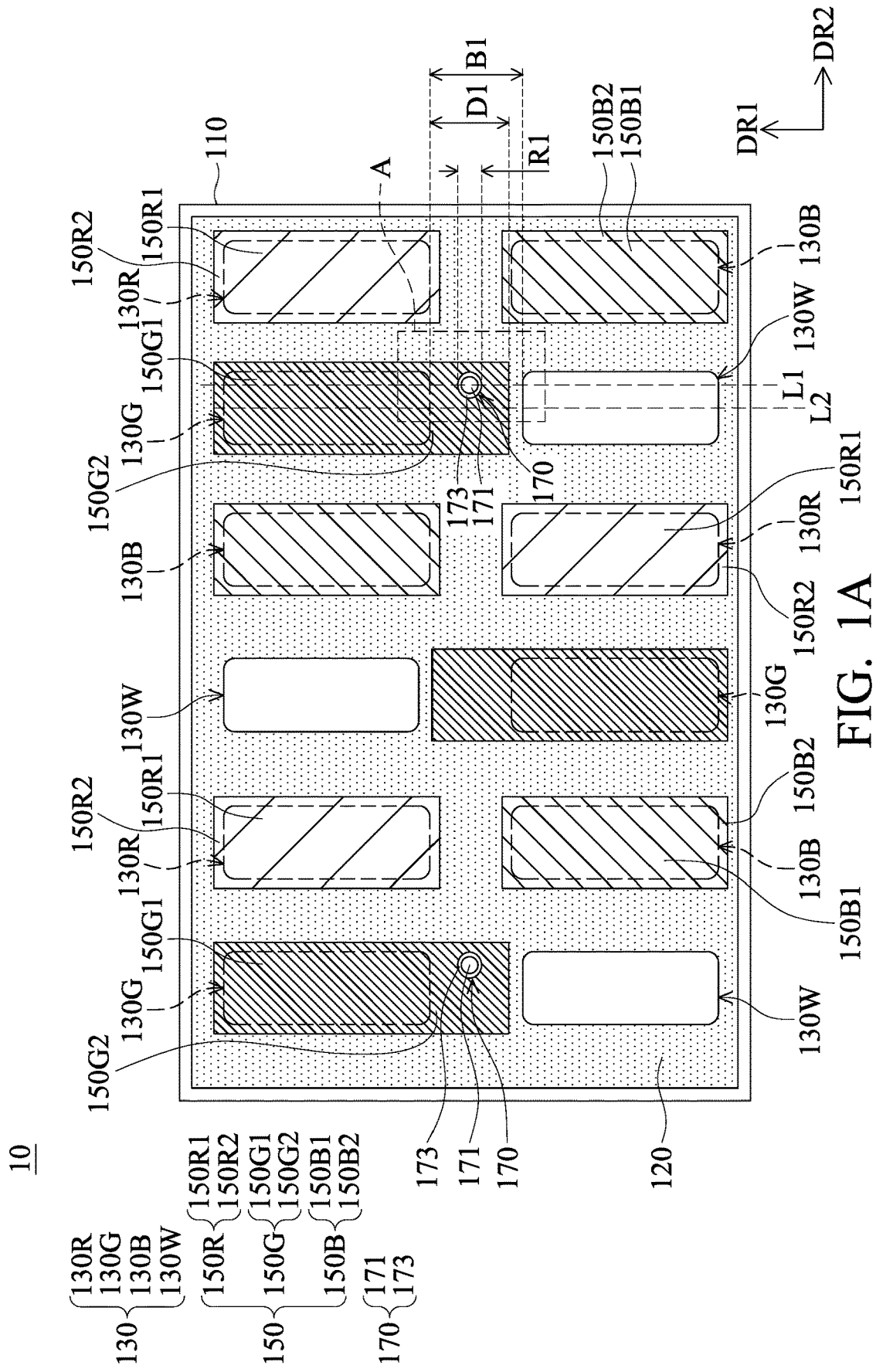
FIG. 1A shows a top view of an optical structure according to an embodiment of the disclosure.

The following description is made for the purpose of illustrating the general principles of the invention and should not be taken in a limiting sense. The scope of the invention is best determined by reference to the appended claims.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature above or on a second feature in the description that follows may include embodiments in which the first and second features are formed in direct contact, and may also include embodiments in which additional features may be formed between the first and second features, such that the first and second features may not be in direct contact.

Some terms are used to refer to specific components throughout the specification and the following claims of this disclosure. It should be understood by those of skill in the art that the same components may be referred to by different names by electronic equipment manufacturers. It is not intended herein to distinguish between components that are functionally identical but have different names. In the specification and claims below, the terms "comprise" and "include" are open-ended terms and should be interpreted to mean "contains but not limited to . . . ".

The use of ordinal terms such as "first", "second", etc., in the specification and the claims for modifying an component does not by itself connote any precedence, or order of one claim element over another or the temporal order in which it is formed, but are used merely as labels to distinguish one claim component having a certain name from another component having the same name. Therefore, the first component in the specification may be referred to by the second component in the claims.

Directional terms, such as "on," "under," "left," "right", "front", "back", and the like, only with reference to the direction of the accompanying drawings. Therefore, the directional terms used herein are for illustrative purposes and are not intended to limit the present disclosure. It should be understood that in order to specifically describe or illustrate the components, directional terms may be presented in various forms that may be known to those of skill in the art. Herein, when a component is referred to as "overlap" another component, it should be understood that the component overlaps the other component partly or completely.

Some embodiments of the disclosure are described. Additional operations can be provided before, during, and/or after the stages described in these embodiments. Some of the stages that are described can be replaced or eliminated for different embodiments. Although some embodiments are discussed with operations performed in a particular order, these operations may be performed in another logical order.

Furthermore, when a component or film is referred to as being "on" or "connected to" another component or film, the component or film may be directly on or directly connected to the other component or film, or intervening components or layers may be between the component or film and the other component or film (in the indirect case). In contrast, when a component is referred to as being "directly on" or "directly connected to" another component or film, there are no intervening components or layers between the component or film and the other component or film. When a component is referred to as being "coupled" to another component in the disclosure, it may include cases where there may be other components between the component and the another component to electrically connect the component and the another component, or cases where the component is directly electrically connected to the another component without other components therebetween. When a component is referred to as being "directly coupled" to another component, it refers to a case where the component is directly electrically connected to the another component without there being any other components between them.

Herein, the term "about", "substantially" indicates a value of a given value or range that varies within 10%, or within 5%, or within 3%, or within 2%, or within 1%, or within 0.5%. The value given here is an approximate value, i.e., "about", or "substantially", may be implied without specifying "about", or "approximate". The term "a range between a first value and a second value" means that the range includes the first value, the second value and other values therebetween.

In the disclosure, the measurement of the length, thickness and width may be by optical microscope, electron microscope or other methods, but are not limited thereto.

Unless otherwise defined, all terms (including technical and scientific terms) used herein have the same meaning as commonly understood by a person skilled in the art to which the disclosure pertains. It will be further understood that terms, such as those defined in commonly used dictionaries, should be interpreted as having a meaning consistent with the relevant technology and the context or background of this disclosure and will not be interpreted in an idealized or overly formal sense unless expressly so defined herein.

The electronic device of the disclosure may include a display device, an antenna device, or a sensing device, a touch electronic device (touch display), a curved surface electronic device (curved display) or a non-rectangular electronic device (free shape display), but it is not limited thereto. The electronic device may be a bendable electronic device or a flexible electronic device. The antenna device maybe, for example, a liquid-crystal antenna, but it is not limited thereto. The antenna device may comprise, for example, an antenna splicing device, but is not limited thereto. It should be noted that the electronic device can be but not limited to any combination of the aforementioned devices. In addition, a shape of the electronic device may be a rectangle, a circle, a polygon, a shape with curved edges, or other suitable shape. The electronic device may comprise electronic components. The electronic components may comprise passive components and active components, such as capacitors, resistors, inductors, diodes, transistors, etc. The diodes may comprise light-emitting diodes or photo-diodes. The light-emitting diodes may comprise, for example, organic light-emitting diodes (OLED), mini light-emitting diodes (mini-LED), micro light-emitting diodes (micro-LED) or quantum dot light-emitting diodes (quantum dot LED), but it is not limited thereto. The electronic device may have peripheral systems, such as a drive system, control system, light source system, shelf system and the likes for supporting the display device, the antenna device, or the splicing device. The disclosure will be described below by referring a display device, but the present disclosure is not limited thereto.

FIG. 1A shows a top view of an optical structure according to an embodiment of the disclosure. As shown in FIG. 1A, the optical structure 10 comprises a substrate 110, a light shielding layer 120 disposed on the substrate 110, a light filter layer 150 disposed on the substrate 110, and a spacer 170 disposed on the light filter layer 150, but the present disclosure is not limited thereto. In some embodiments, the optical structure 10 may further comprise a stacked structure, such as an insulating layer, disposed between the light filter layer 150 and the spacer 170, but the disclosure is not limited thereto.

The substrate 110 may comprise a flexible substrate, a rigid substrate or a combination thereof, but is not limited thereto. In some embodiments, the substrate 110 may be a transparent substrate or a semi-transparent substrate. According to some embodiments, the material of the substrate 110 may comprise glasses, quartz, sapphires, ceramics, polyimides (PI), polycarbonates (PC), polyethylene terephthalates (PET), polypropylenes (PP), other suitable materials, or any combination of the foregoing, but the present disclosure is not limited thereto. In some embodiments, the substrate 110 may further comprise a conductive layer, an insulating layer, a dielectric layer, a display medium layer, an air layer, a vacuum layer, or any combination thereof, but the disclosure is not limited thereto.

The light shielding layer 120 can shield light comprising the light passing through the substrate 110 or the light going to pass through the substrate 110. The light shielding layer 120 may comprise dark resins, dark photo-resists, dark inks, dark pigments, or any combination of the foregoing, such as black resin, black photo-resist, black ink, black pigment or any combination of the foregoing, but the disclosure is not limited thereto. In some embodiments, the light shielding layer 120 may comprise materials with low light transmittance, such as metal. The light shielding layer 120 is disposed on the substrate 110 and comprises a plurality of openings 130 arranged in a column along a first direction DR1. In some embodiments, the light shielding layer 120 comprise columns of the openings 130, and the columns of the openings 130 are arranged along a second direction DR2 perpendicular to the first direction DR1. The opening 130 is an open area of the optical structure 10 through which light can pass. In some embodiments, the first direction DR1 may be, for example, the extending direction of the longer side of the opening 130, but is not limited thereto.

The light filter layer 150 may be an optical layer through which light having a specific wavelength range can pass. According to the color of light passing through the light filter layer 150, the light filter layer 150 can be further divided into a red light filter layer 150R (allowing red light to pass through), a green light filter layer 150G (allowing green light to pass through), and a blue light filter layer 150B (allowing blue light to pass through). In FIG. 1A, the light filter layer 150 comprising a red light filter layer 150R, a green light filter layer 150G, and a blue light filter layer 150B is used as an example for illustration, but the disclosure is not limited thereto. In some embodiments, the light filter layer 150 may comprise a red light filter layer 150R, a green light filter layer 150G, a blue light filter layer 150B, and the light filter layer that allows other color light to pass through.

In the embodiment of FIG. 1A, the red light filter layer 150R may comprise a first portion 150R1 and a second portion 150R2 arranged in the first direction DR1. The green light filter layer 150G may comprise a first portion 150R and a second portion 150G2 arranged in the first direction DR1. The blue light filter layer 150B may comprise a first portion 150B1 and a second portion 150B2 arranged in the first direction DR1, but the disclosure is not limited thereto. In some embodiments, the red light filter layer 150R may further comprise a side portion connecting the first portion 150R1 and the second portion 150R2. The green light filter layer 150G may further comprise a side portion connecting the first portion 150G1 and the second portion 150G2. The blue light filter layer 150B may further comprise a side portion connecting the first portion 150B1 and the second portion 150B2, but the disclosure is not limited thereto.

The first portion 150R1 of the red light filter layer 150R is disposed in the opening 130R. The second portion 150R2 of the red light filter layer 150R connects to the first portion 150R1 and is disposed on the light shielding layer 120. In the embodiment of FIG. 1A, the second portion 150R2 of the red light filter layer 150R may not overlap the opening 130R. The first portion 150G1 of the green light filter layer 150G is disposed in the opening 130G. The second portion 150G2 of the green light filter layer 150G connects to the first portion 150G1 and is disposed on the light shielding layer 120. In the embodiment of FIG. 1A, the second portion 150G2 of the green light filter layer 150G may not overlap the opening 130G. The first portion 150B1 of the blue light filter layer 150B is disposed in the opening 130B. The second portion 150B2 of the blue light filter layer 150B connects to the first portion 150B1 and is disposed on the light shielding layer 120. In the embodiment of FIG. 1A, the second portion 150B2 of the blue light filter layer 150B may not overlap the opening 130B. The light filter layer may not be disposed in the opening 130W, but the disclosure is not limited thereto. In some embodiments, the sizes of the opening 130R, the opening 130G and the opening 130B are similar, and the sizes of the opening 130R, the opening 130G and the opening 130B are slightly greater than the opening 130W, but the disclosure is not limited thereto. In some embodiments, a layer with higher light transmission can also be partially disposed in the opening in which no light filter layer is disposed. For example, an insulating layer may also comprise a first portion and a second portion. The first portion of the insulating layer may be disposed in the opening 130W and the second portion may be disposed on the light shielding layer 120. The second portion of the insulating layer may not overlap the opening 130W. Accordingly, the light passing through the opening 130W will be less influenced. For example, white light passing through the opening 130W may be still white light.

The arrangement of the opening 130B, the opening 130W, the opening 130G and the opening 130R is not particularly limited. In some embodiments, the openings 130B may be arranged in columns along the first direction DR1, the openings 130R may be arranged in columns along the first direction DR1, the openings 130G may be arranged in columns along the first direction DR1, and the openings 130W may be arranged in columns along the first direction DR1. In some embodiments, the openings 130W are not adjacent to each other in the first direction DR1, the openings 130G are not adjacent to each other in the first direction DR1, the openings 130B are not adjacent to each other in the first direction DR1, and the openings 130R are not adjacent to each other in the first direction DR1. In some embodiments, the sizes of the opening 130B, the opening 130W, the opening 130G, and the opening 130R are independent to each other. The lengths of the opening 130B, the opening 130W, the opening 130G, and the opening 130R in the first direction DR1 and/or in the second direction DR2 may be different from or the same as each other.

The spacer 170 may comprise a three-dimensional structure having a top surface 171 and a bottom surface 173. A projection area of the top surface 171 onto the substrate 110 may be less than a projection area of the bottom surface 173 onto the substrate 110. The projection of top surface 171 onto the substrate 110 may be in the projection of the bottom surface 173 onto the substrate 110. In some embodiments, from the top view of the optical structure 10, the top surface 171 and the bottom surface 173 of the spacer 170 may independently have a circular, elliptical, rectangular, or polygonal shape, but the disclosure is not limited thereto. In the embodiment of FIG. 1A, both of the top surface 171 and the bottom surface 173 of the spacer 170 are circular, but the disclosure is not limited thereto. In some embodiments, the top surface 171 of the spacer 170 can be circular and the bottom surface 173 can be oval. The material of the spacer 170 may comprise acrylic resins, polyamides, polyimides, novolac epoxy resins, other suitable materials, or any combination of the foregoing, but the disclosure is not limited thereto.

Figure 2:
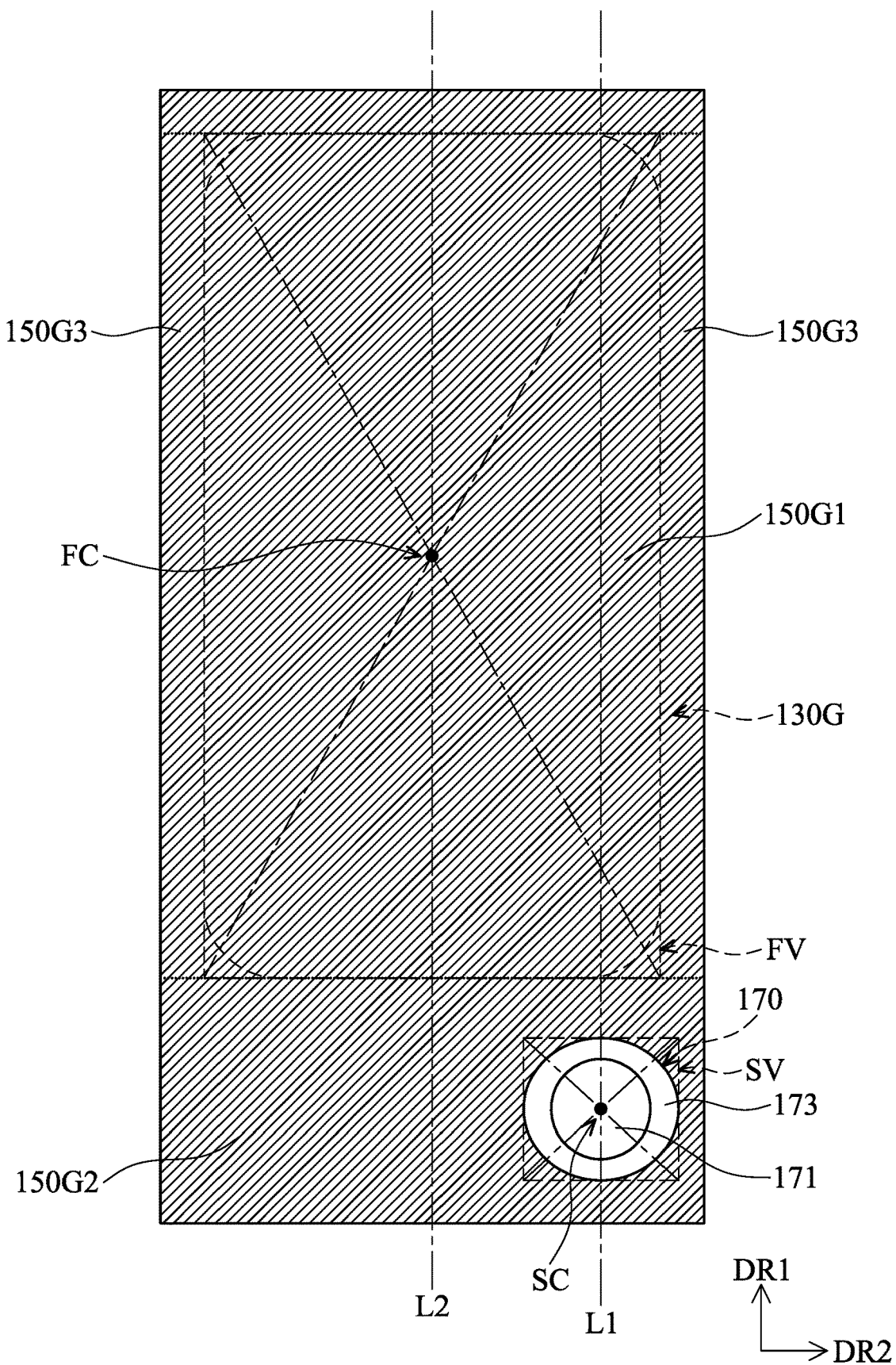
FIG. 2 is an enlarged schematic view of a spacer and the light filter layer where the spacer is disposed on in the optical structure shown in FIG. 1A.

The spacer 170 may be disposed on the light filter layer 150. In the embodiment of FIG. 1A, the spacer 170 is disposed on the second portion 150G2 of the green light filter layer 150G. FIG. 2 is an enlarged schematic view of the spacer 170 and the light filter layer 150G on which the spacer 170 is disposed in the optical structure 10 shown in FIG. 1A. As shown in FIG. 2, the spacer 170 has a center SC, and the first portion 150G1 of the green light filter layer 150G has a center FC. The center SC of the spacer 170 is the point where two diagonal lines of a virtual rectangle SV intersect, wherein the virtual rectangle SV is a smallest virtual rectangle, which can enclose the spacer 170. The center FC of the first portion 150G1 is the point where two diagonal lines of a virtual rectangle FV intersect, the virtual rectangle FV is a smallest virtual rectangle, which can enclose the first portion 150G1. The second portion 150G2 of the green light filter layer 150G may be a portion outside two opposite sides of the smallest virtual rectangle FV which are parallel to the second direction DR2. The side portion 150G3 of the green light filter layer 150G may be a portion in the two opposite sides of the smallest virtual rectangle FV which are parallel to the second direction DR2. In some embodiments, in the top view of the optical structure 10, a first virtual line L1 may cross or pass through the center SC and extends in the first direction DR1, a second virtual line L2 may cross or pass through the center FC of the first portion 150G1 and extends in the first direction DR1. The first virtual line L1 and the second virtual line L2 are separated from each other by a distance, and the distance is not 0. In the embodiment, when the optical structure of the disclosure is used in a liquid-crystal display device, the first portion 150G1 of the green light filter layer 150 disposed in the opening 130G can make the passing light show green color and be used for displaying. Therefore, a non-uniform alignment region in the alignment film is presented due to the spacer 170, a overlapping range of the non-uniform alignment region and the first portion 150G1 may be reduced, thereby reducing the color deviation of the liquid-crystal display device, increasing the aperture ratio of the liquid-crystal display device and/or improving the display quality of the liquid-crystal display device, but the disclosure is not limited thereto. In some embodiments, if the bottom surface 173 of the spacer 170 has other shapes, such as a rectangle, the second virtual line L2 can also overlap the first virtual line L1. That is, the distance between the second virtual line L2 and the first virtual line L1 may be 0.

Figure 3:
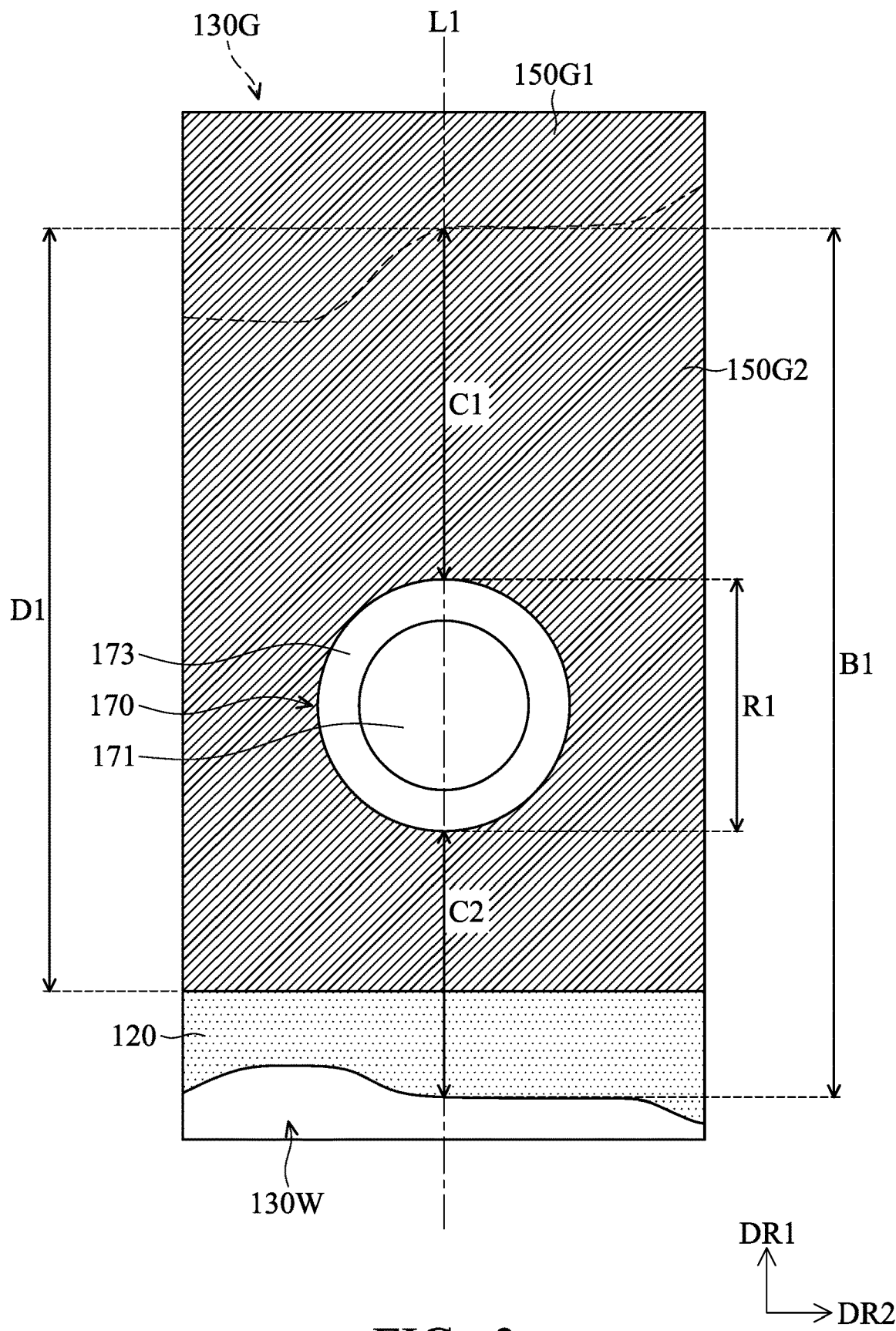
FIG. 3 is an enlarged schematic view of area A in the optical structure shown in FIG. 1A.

FIG. 3 is an enlarged schematic view of area A in the optical structure 10 shown in FIG. 1A. Referring to FIG. 1A and FIG. 3, the opening 130G and the opening 130W are adjacent to each other in the first direction DR1 and may have arc-shaped boundaries, but the disclosure is not limited thereto. The bottom surface 173 of the spacer 170 between the opening 130G and the opening 130W has a second length R1 on the first virtual line L1. The second portion 150G2 where the spacer 170 is disposed on has a first length D1 on the first virtual line L1. The light shielding layer 120 has a third length B1 on the first virtual line L1. In other words, the first length D1, the second length R1 and the third length B1 are measured along the first virtual line L1. The first length D1 is greater than or equal to the second length R1 and less than or equal to the third length B1. In some embodiments, on the first virtual line L1, there is a first distance C1 between the spacer 170 and the opening 130G, and a second distance C2 between the spacer 170 and the opening 130W. The first distance C1 may be a minimum distance between a bottom portion of the spacer 170 and a bottom portion of the opening 130G. The second distance C2 may be a minimum distance between a bottom portion of the spacer 170 and a bottom portion of the opening 130W. In other words, first distance C1 and the second distance C2 are measured along the first virtual line L1. The ratio C1/C2 of the first distance C1 to the second distance C2 is greater than or equal to 0.7 and less than or equal to 1.3. In the embodiment, when the optical structure of the disclosure is used in a liquid-crystal display device, the overlapping range of the non-uniform alignment region in the alignment film (which is presented due to the spacer 170) and the light shielding layer 120 can be increased, the color deviation of the liquid-crystal display device can be reduced, the aperture ratio of the liquid-crystal display device can be increased and/or the display quality of the liquid-crystal display device can be improved.

Figure 1B:
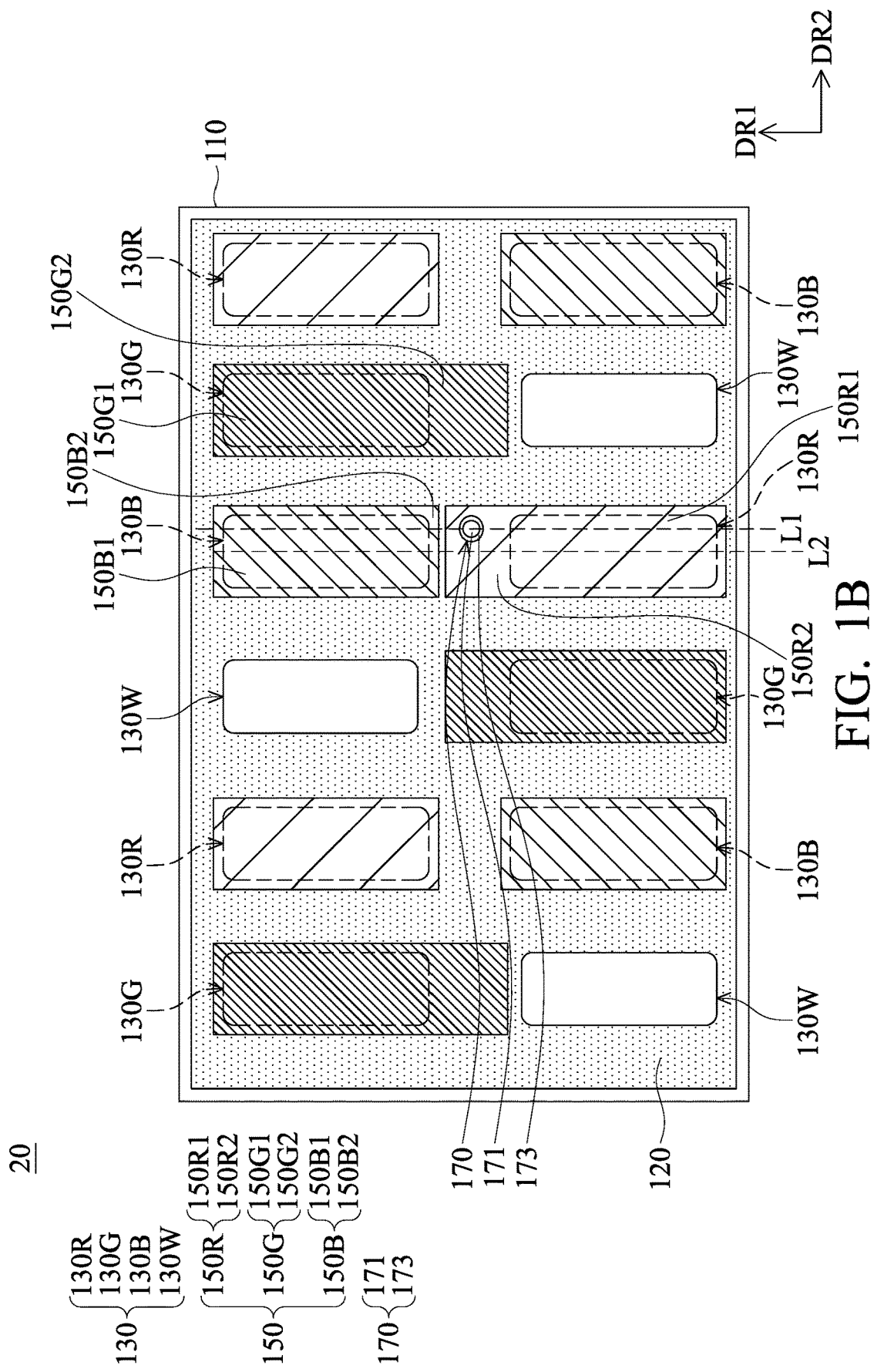
FIG. 1B shows a top view of an optical structure according to an embodiment of the disclosure.

FIG. 1B shows a top view of an optical structure 20 according to an embodiment of the disclosure. The optical structure 20 shown in FIG. 1B is similar to the optical structure 10 shown in FIG. 1A, the main difference is that the spacer 170 is disposed on the second portion 150R2 of the red light filter layer 150R, therefore, the similar structure is not herein.

Figure 1C:
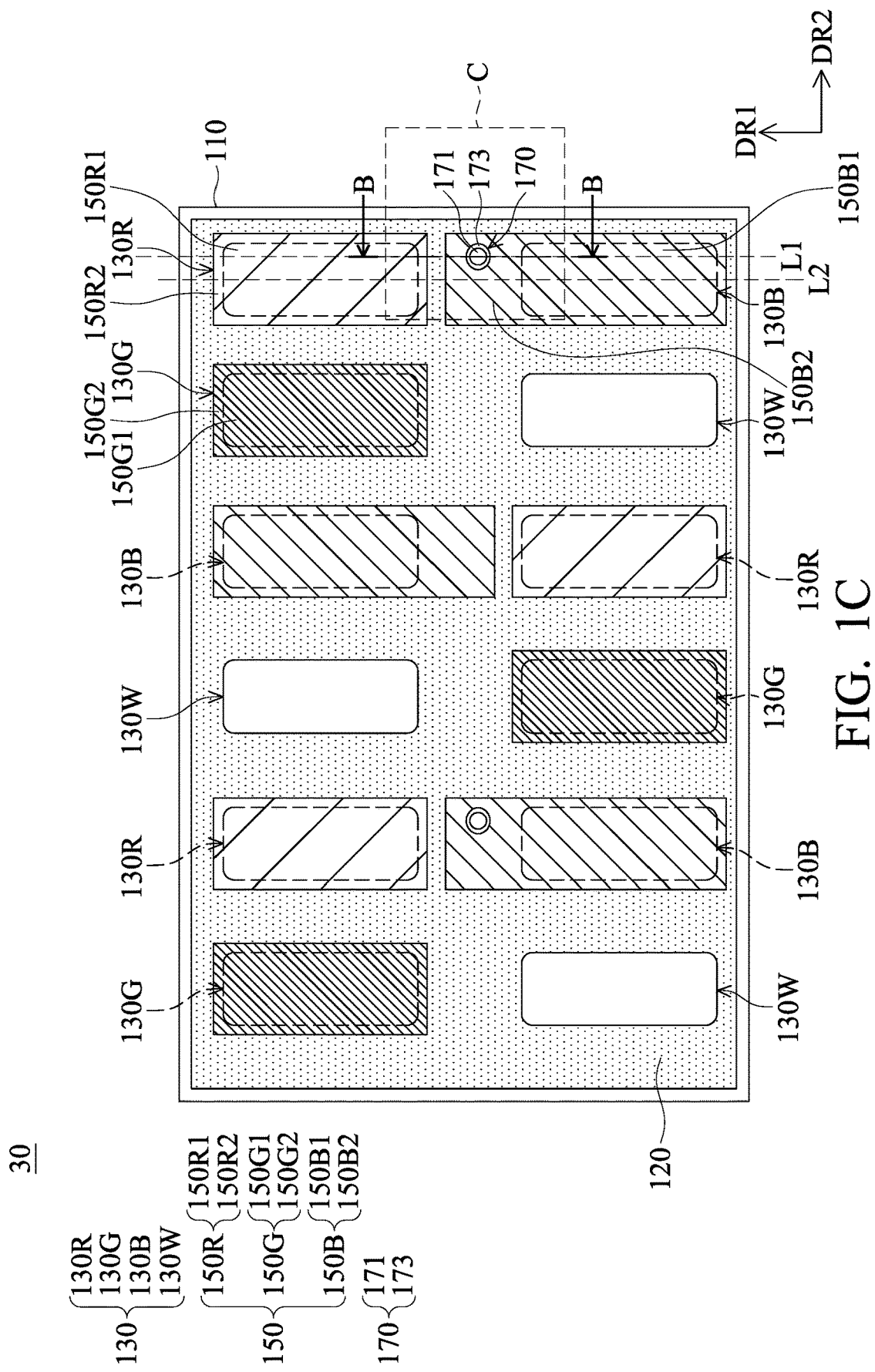
FIG. 1C shows a top view of an optical structure according to an embodiment of the disclosure.
Figure 4A:
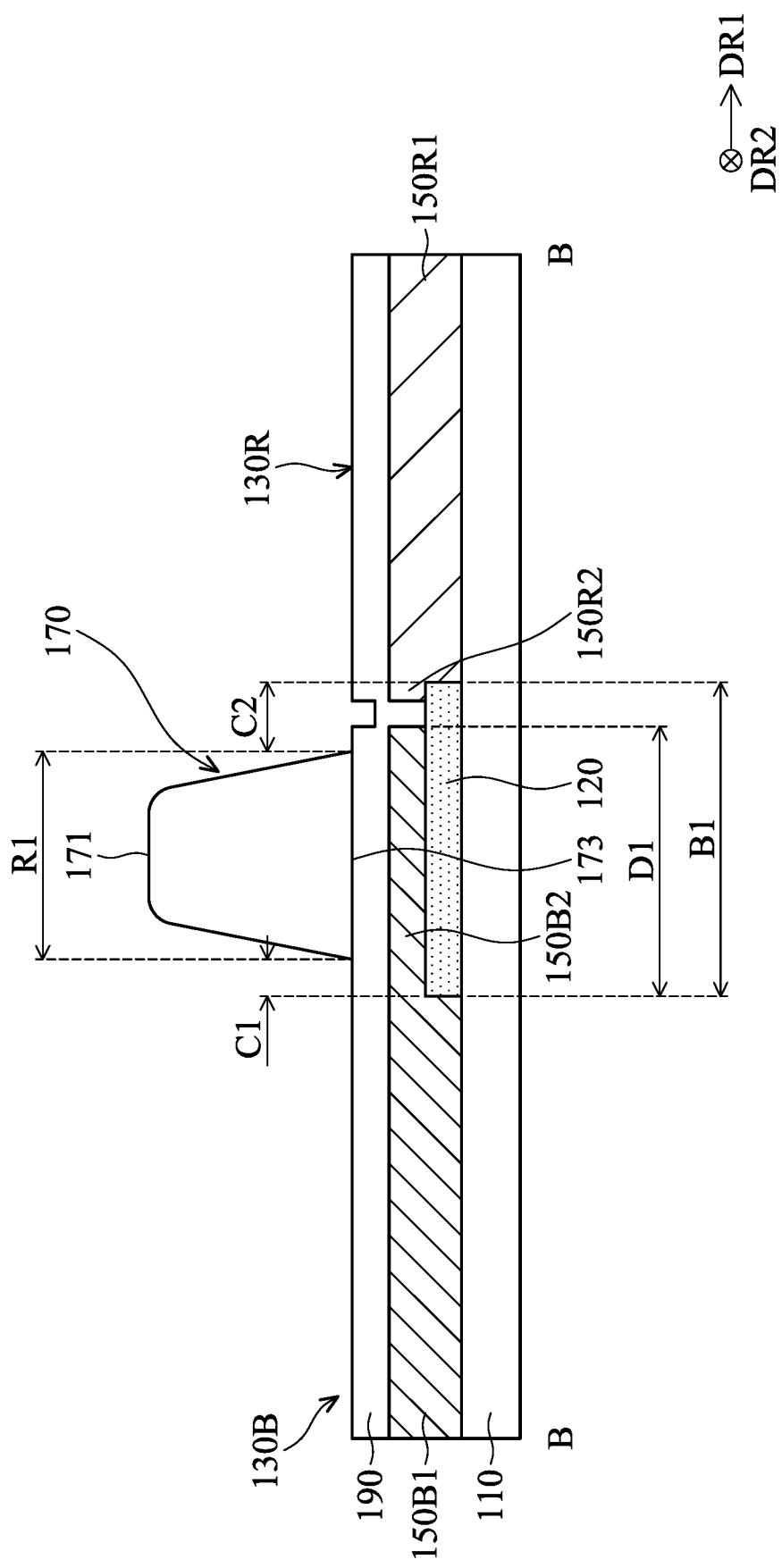
FIG. 4A is a schematic cross-sectional view of the optical structure shown in FIG. 1C taken along line B-B.
Figure 4B:
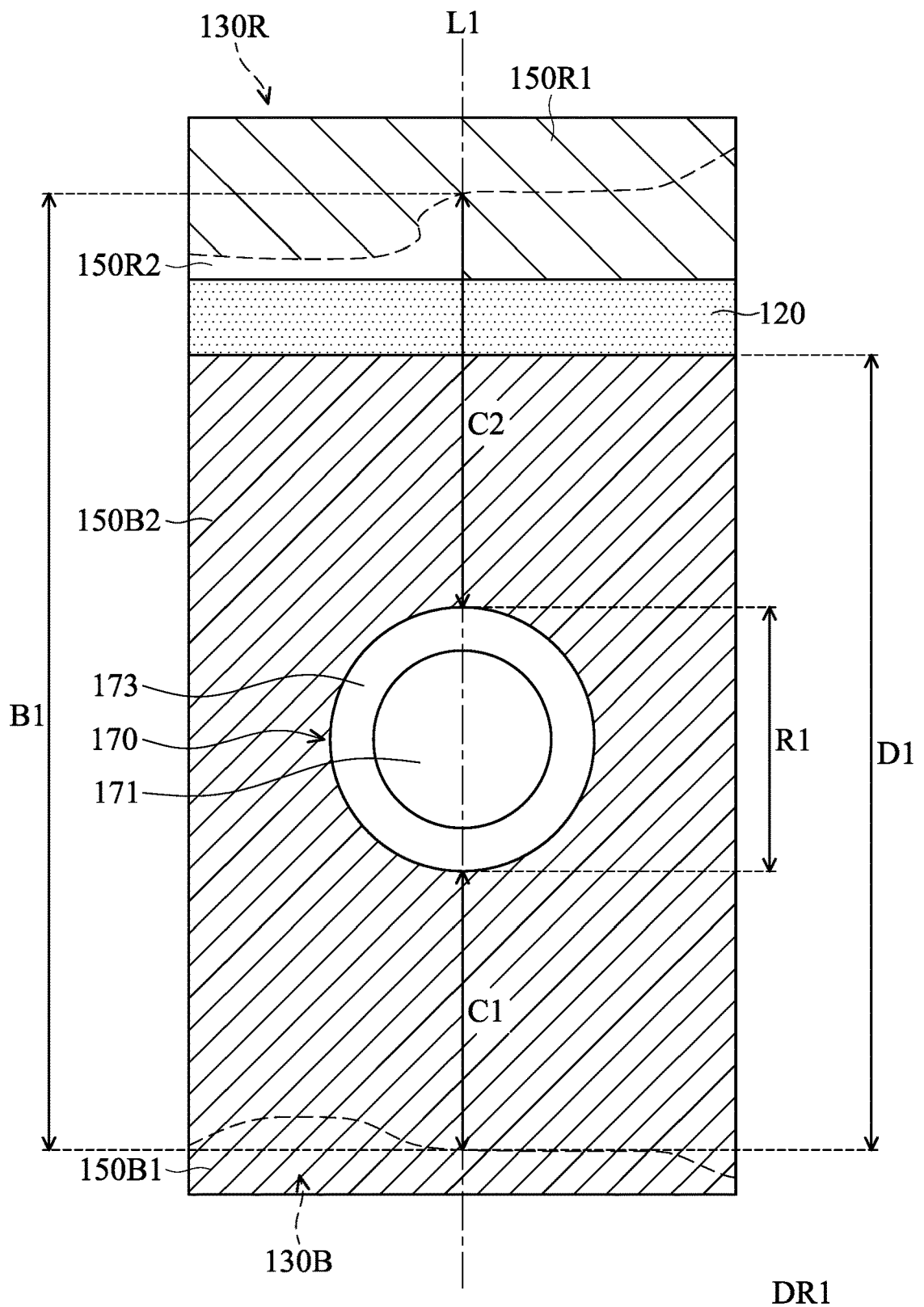
FIG. 4B is an enlarged schematic view of area C in the optical structure shown in FIG. 1C.

FIG. 1C shows a top view of an optical structure 30 according to an embodiment of the disclosure. FIG. 4A is a schematic cross-sectional view of the optical structure 30 shown in FIG. 1C taken along line B-B. FIG. 4B is an enlarged schematic view of area C in the optical structure 30 shown in FIG. 1C. As shown in FIG. 1C and FIG. 4A, the optical structure 30 comprises a substrate 110, a light shielding layer 120 disposed on the substrate 110, a light filter layer 150 disposed on the substrate 110, a spacer 170 disposed on the light filter layer 150, and an insulating layer 190 disposed between the light filter layer 150 and the spacer 170. The substrate 110, the light shielding layer 120, the light filter layer 150, and the spacer 170 in the optical structure 30 are the same as the substrate 110, the light shielding layer 120, the light filter layer 150, and the spacer 170 in the optical structure 10. Therefore, they will not be repeated hereinafter.

As shown in FIG. 1C, the light shielding layer 120 in the optical structure 30 comprises an opening 130B, an opening 130W, an opening 130G, and an opening 130R. The main difference between the embodiment of FIG. 1C and the embodiment of FIG. 1A is the length of the opening 130B in the first direction DR1. Therefore, compared with the optical structure 10 shown in FIG. 1A, in the optical structure 30 shown in FIG. 1C, the light shielding layer 120 between two openings which adjacent to each other in the first direction DR1 will have a longer length on the first virtual line L1. In this embodiment, the length of the opening 130B in the first direction DR1 may be slightly less than the lengths of the openings 130W, 130G, and 130R in the first direction DR1. In another embodiment, the length of the opening 130B in the first direction DR1 may be greater than or equal to the lengths of the openings 130W, 130G, and 130R in the first direction DR1.

Referring to FIG. 1C, FIG. 4A and FIG. 4B, the spacer 170 is disposed on the second portion 150B2 of the blue light filter layer 150B. The insulating layer 190 is disposed on the blue light filter layer 150B and between the blue light filter layer 150B and the spacer 170, but the disclosure is not limited thereto. The insulating layer 190 may be a single-layer structure or a multi-layer structure. Materials for the insulating layer 190 may comprise, for example, silicon oxides, silicon nitrides, acrylic-based polymers, siloxane-based polymers, epoxy-based polymers, other suitable materials or combinations of the foregoing, but the disclosure is not limited thereto. The possibility of the light filter layer 150 being polluted or influenced by moisture can be reduced due to the insulating layer 190 disposed on the light filter layer 150. Furthermore, the insulating layer 190 may also comprise a first portion disposed in the opening 130W and a second portion disposed on the light shielding layer 120. Accordingly, the light passing through the opening 130W will be less influenced. For example, white light passing through the opening 130W may be still white light. In addition, when the optical structure of the disclosure is used in a liquid-crystal display device, a conductive layer (not shown) may be disposed on the insulating layer 190. That is, the insulating layer 190 is disposed between the conductive layer and the light filter layer 150. The possibility of the light filter layer 150 being polluted or influenced by moisture can be reduced and/or allow the insulating layer 190 to provide a relatively flat surface for disposing the conductive layer. The opening 130B and the opening 130R are adjacent to each other in the first direction and each of them has an arc-shaped opening boundary. The bottom surface 173 of the spacer 170 between the opening 130B and the opening 130R has a second length R1 on the first virtual line L1. The second portion 150B2 has a first length D1 on the first virtual line L1. The light shielding layer 120 has a third length B1 on the first virtual line L1. In other words, the first length D1, the second length R1 and the third length B1 are measured along the first virtual line L1. The first length D1 is greater than or equal to the second length R1 and less than or equal to the third length B1. In some embodiments, on the first virtual line L1, there is a first distance C1 between the spacer 170 and the opening 130B and a second distance C2 between the spacer 170 and the opening 130R. The first distance C1 may be a minimum distance between a bottom portion of the spacer 170 and a bottom portion of the opening 130B. The second distance C2 may be a minimum distance between a bottom portion of the spacer 170 and a bottom portion of the opening 130R. In other words, first distance C1 and the second distance C2 are measured along the first virtual line L1. The ratio C1/C2 of the first distance C1 to the second distance C2 is greater than or equal to 0.7 and less than or equal to 1.3. In this embodiment, the spacer 170 is disposed between a blue sub-pixel and a red sub-pixel to reduce the influence of the spacer 170 on the blue sub-pixel or the red sub-pixel, thereby reducing the color deviation of the display device comprising the optical structure of the disclosure or improving the display quality of the display device. In addition, when the optical structure of the disclosure is used in a liquid-crystal display device, the overlapping range of the non-uniform alignment region in the alignment film (which is presented due to the spacer 170) and the light shielding layer 120 can be increased, the color deviation of the liquid-crystal display device can be reduced, the aperture ratio of the liquid-crystal display device can be increased and/or the display quality of the liquid-crystal display device can be improved.

Figure 5A:
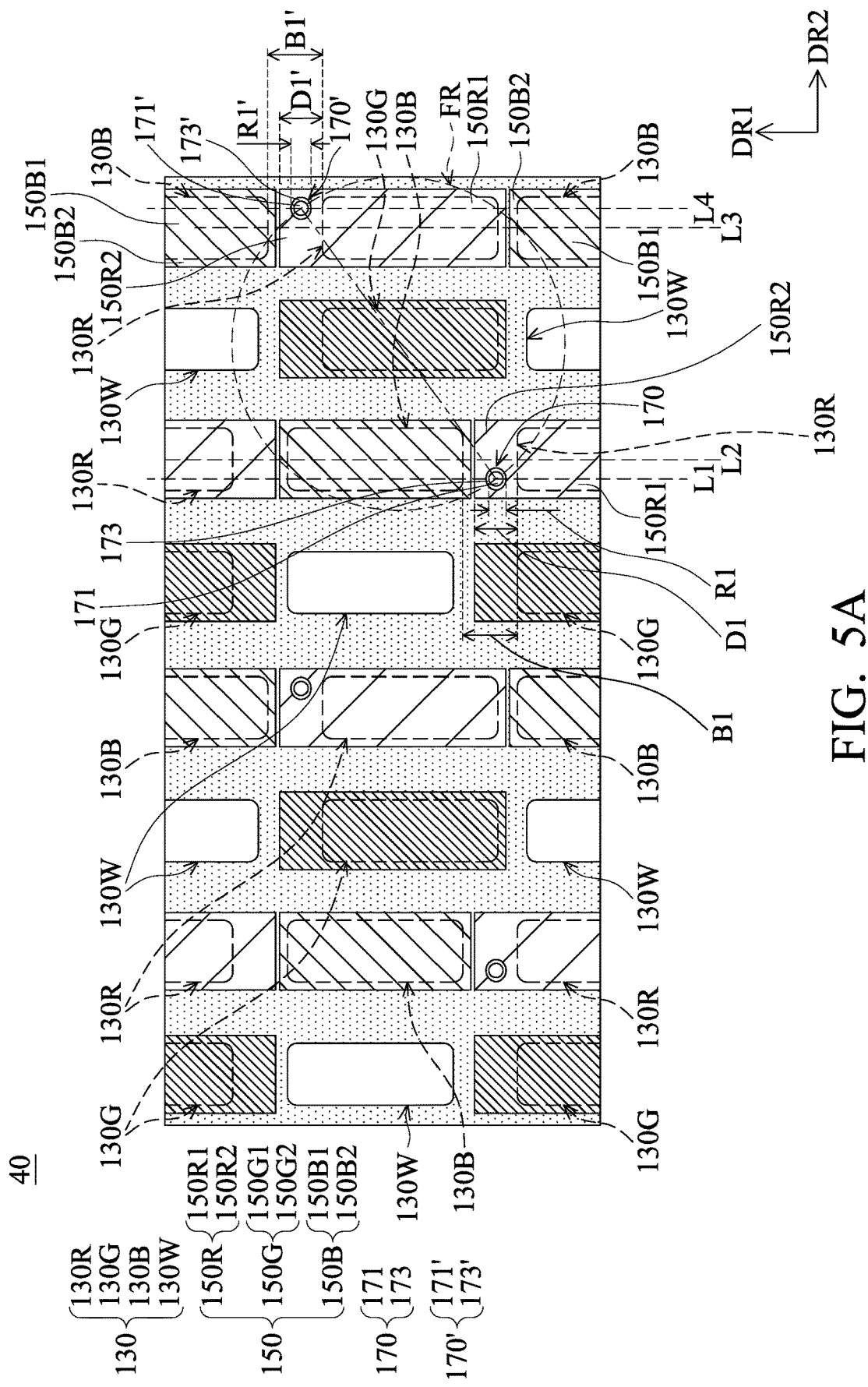
FIG. 5A shows a top view of an optical structure according to an embodiment of the disclosure.
Figure 5B:
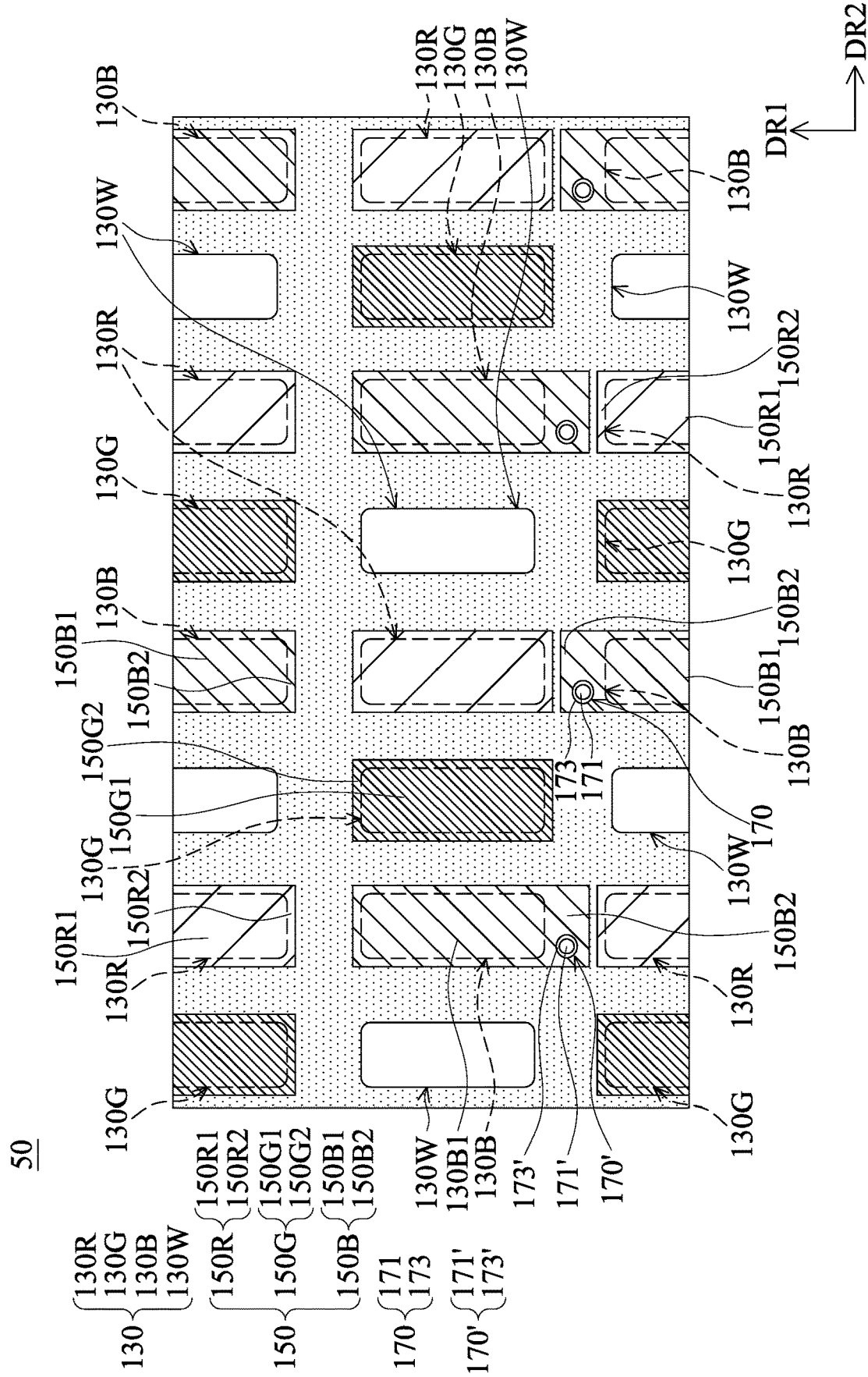
FIG. 5B shows a top view of an optical structure according to an embodiment of the disclosure.

The above description in conjunction with FIG. 1A to FIG. 4B is mainly used to illustrate the arrangement of one spacer 170. In some embodiments, the optical structure may comprise a plurality of spacers 170 arranged in the same manner, but the disclosure is not limited thereto. FIGS. 5A to 5B will be used to further illustrate the arrangement of the plurality of spacers 170 in the optical structure, and the arrangement relationship between a spacer 170 and another spacer 170 adjacent to it.

FIG. 5A shows a top view of an optical structure 40 according to an embodiment of the disclosure. As shown in FIG. 5A, the optical structure 40 comprises a substrate 110, a light shielding layer 120 disposed on the substrate 110, a light filter layer 150 disposed on the substrate 110, and a spacer 170 and a spacer 170' disposed on the light filter layer 150, but the disclosure is not limited thereto. In some embodiments, the optical structure 40 may further comprise an insulating layer disposed between the light filter layer 150 and the spacer 170 and the spacer 170'. The structures of the substrate 110, the light shielding layer 120, the light filter layer 150 and the spacer 170 in the optical structure 40 are similar to the structures of the substrate 110, the light shielding layer 120, the light filter layer 150 and the spacer 170 in the optical structure 10. Therefore, they will not be repeated hereinafter. The spacer 170' and the spacer 170 may have the same structure. The spacer 170' comprise a three-dimensional structure having a top surface 171' and a bottom surface 173'. Similarly, referring to FIG. 2, the spacer 170' of FIG. 5A has a center (not shown), and the first portion 150R1 of the red light filter layer 150R on which the spacer 170' is disposed has a center (not shown). The definitions of the location of the center of the above-mentioned spacer 170' and the location of the center of the first portion 150R1 of the red light filter layer 150R on which the spacer 170' is disposed are the same as that of the location of the center SC of the spacer 170 and the location of the center FC of the first portion 150G1 of the green light filter layer 150G on which the spacer 170 is disposed. Therefore, they will not be repeated hereinafter. In some embodiments, a third virtual line L3 may cross or pass through the center of the first portion 150R1 and extends in the first direction DR1 and a fourth virtual line L4 may cross or pass through the center of the spacer 170' and extends in the first direction DR1. The third virtual line L3 and the fourth virtual line L4 are separated from each other. That is, the fourth virtual line L4 and the third virtual line L3 are separated from each other by a distance, and the distance is not 0, but the disclosure is not limited thereto. In some embodiments, the fourth virtual line L4 may overlap the third virtual line L3. That is, the distance between the fourth virtual line L4 and the third virtual line L3 may be 0.

In this embodiment, the spacer 170' is adjacent to the spacer 170. The term two spacers are "adjacent" to each other in the disclosure means that there are no other spacers in a virtual circle which is drawn with a connecting length of the centers of the two spacers as the diameter. As shown in FIG. 5A, a virtual circle FR is drawn with a connecting length of the centers of the spacer 170' and the spacer 170 as a diameter. There are no other spacers in the virtual circle FR, which means that the spacer 170' and Spacers 170 are adjacent to each other.

In the embodiment of FIG. 5A, the spacer 170 is disposed on the second portion 150R2 of the red light filter layer 150R, and the spacer 170' is disposed on the second portion 150R2 of the other red light filter layer 150R, but the disclosure is not limited thereto. In some embodiments, the spacer 170 and the spacer 170' may be disposed on the light filter layers with different color, for example, the spacer 170 may be disposed on the second portion 150R2 of the red light filter layer 150R, and the spacer 170' may be disposed on the second portion 150G2 of the green light filter layer 150G.

In the embodiment of FIG. 5A, the spacer 170' is disposed between the opening 130R and the opening 130B. The opening 130R and the opening 130B are adjacent to each other in the first direction. The bottom surface 173' of the spacer 170' between the opening 130R and the opening 130B has a second length R1' on the fourth virtual line L4. The second portion 150R2 where the spacer 170' is disposed on has a length R1 on the fourth virtual line L4. The light shielding layer 120 has a third length B1' on the fourth virtual line L4. The first length D1' is greater than or equal to the second length R1' and less than or equal to the third length B1'. In some embodiments, the relationship of the distance between the spacer 170' and the opening 130R and the distance between the spacer 170' and the opening 130B are similar to the relationship of the distance between the spacer 170 and the opening 130G and the distance between the spacer 170 and the opening 130W in optical structure 10. For example, on the fourth virtual line L4, there is a third distance (not shown) between the spacer 170' and the opening 130R, and a fourth distance (not shown) between the spacer 170' and the opening 130B. The ratio of the third distance to the fourth distance is greater than or equal to 0.7 and less than or equal to 1.3. In some embodiments, the third virtual line L3 and the second virtual line L2 are separated from each other. In some embodiments, the third virtual line L3 and the first virtual line L1 are separated from each other. In some embodiments, the third virtual line L3 may be separated from the first virtual line L1, the second virtual line L2, and the fourth virtual line L4, as shown in FIG. 5A, but the disclosure is not limited thereto. In some embodiments, the third virtual line L3 may overlap at least any one of the first virtual line L1, the second virtual line L2, and the fourth virtual line L4, but the disclosure is not limited thereto.

FIG. 5B shows a top view of an optical structure 50 according to an embodiment of the disclosure. In the embodiment of FIG. 5B, both of the spacer 170 and the spacer 170' are disposed on the blue light filter layer 150B. The second portion 150B2 of the blue light filter layer 150B where the spacer 170 is disposed on is connected to the first portion 150B1 in a positive direction of the first direction DR1. The second portion 150B2 of the blue light filter layer 150B where the spacer 170' is disposed on is connected to the first portion 150B1 in a negative direction of the first direction DR1. The so-called "positive direction of the first direction DR1" here refers to a direction indicated by DR1 in FIG. 5B, and the term "negative direction of the first direction DR1" refers to a direction opposite to the direction indicated by DR1 in FIG. 5B. In addition, the structures of the substrate 110, the light filter layer 150, and the spacer 170 in the optical structure 50 are similar to the structures of the substrate 110, the light filter layer 150, and the spacer 170 in the optical structure 40. The structure of the light-shielding layer 120 in the optical structure 50 is similar to the structure of the light-shielding layer 120 in the optical structure 30 shown in FIG. 1C. Therefore, they will not be repeated hereinafter. The arrangement relationship of the spacer 170' and the spacer 170 in the optical structure 50 is substantially the same as the arrangement relationship of the spacer 170' and the spacer 170 in the optical structure 40, so it will not be repeated hereinafter.

Figure 5C:
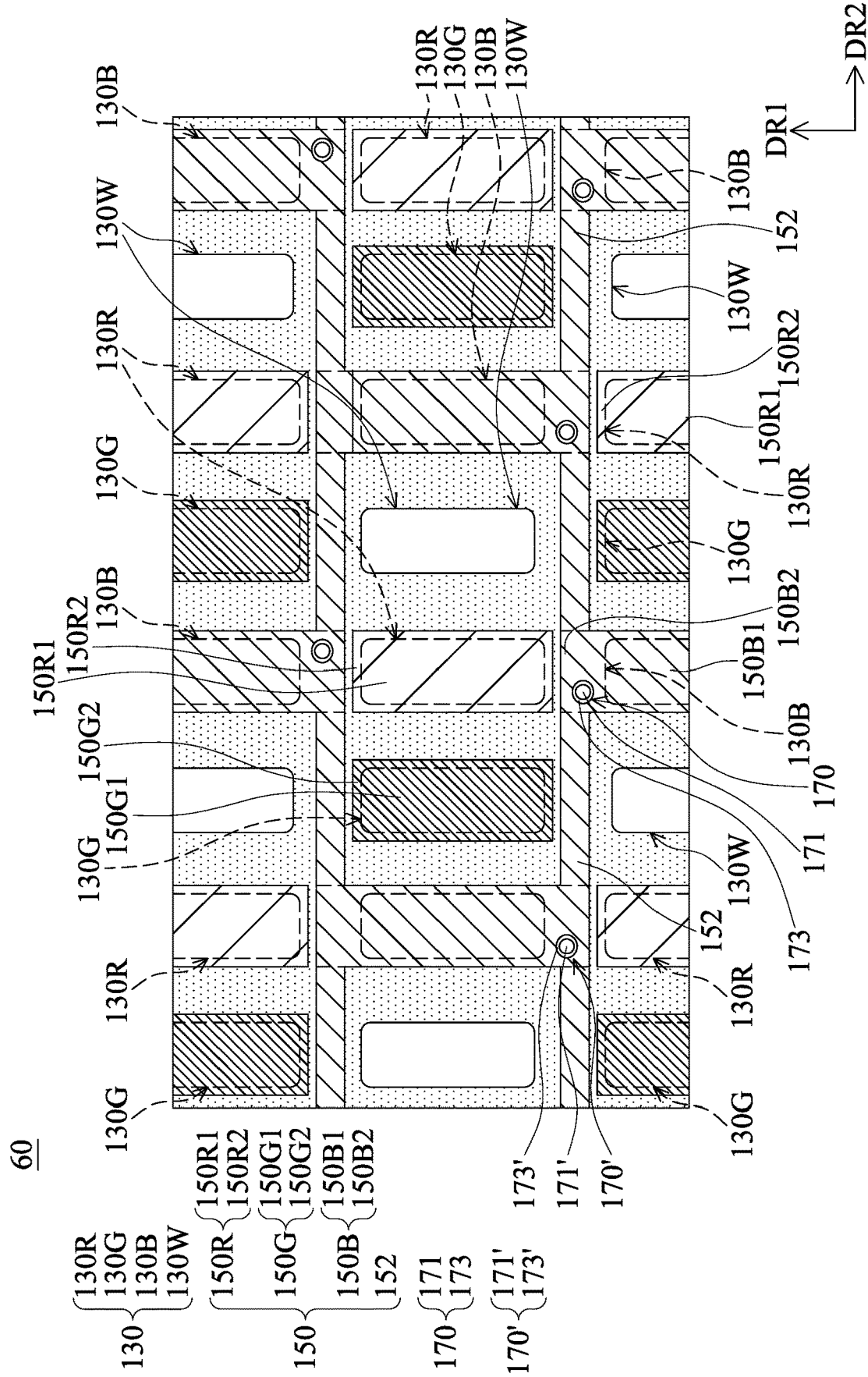
FIG. 5C shows a top view of an optical structure according to an embodiment of the disclosure.

FIG. 5C shows a top view of an optical structure 60 according to an embodiment of the disclosure. The structures of the substrate 110, the light filter layer 150, and the spacer 170 in the optical structure 60 is similar to the structures of the substrate 110, the light filter layer 150, and the spacer 170 in the optical structure 50, so they will not be repeated hereinafter. In the embodiment of FIG. 5C, both of the spacers 170 and 170' are disposed on the blue light filter layer 150B. The second portion 150B2 of the blue light filter layer 150B where the spacer 170 is disposed on and the second portion 150B2 of the blue light filter layer 150B where the spacer 170' is disposed on are connected together by a connecting portion 152 of the light filter layer. In some embodiments, other spacers (not shown) may be further formed on the connecting portion 152 of the light filter layer. Therefore, more spacers 170 may be comprised in the optical structure 60, and the arrangement of the spacers 170 is more free.

By disposing the spacer 170 on the light filter layer 150, the optical structures 10, 30, 40, 50, and 60 having the above-mentioned structures may increase the distance between the bottom surface of the spacer 170 and the substrate 110, reduce the height and/or size of the spacer, reduce the width of the light shielding layer, increase the size of the opening area, and/or increase the light transmittance.

Another aspect of the disclosure is to provide an electric device, which comprises an array structure and one or more of optical structures selected from the above-mentioned optical structures 10, 20, 30, 40, 50, and 60. The optical structure is disposed on the array structure. In some embodiments, the optical structure is disposed on the array structure. That is, the light shielding layer is disposed between the array structure and the substrate of the optical structure. The array structure may comprise a substrate and a circuit layer disposed on the substrate of the array structure. The circuit layer can receive signals from outside. When the above optical structures 10, 20, 30, 40, 50, and 60 are used in the electric device, the aperture ratio of the electric device can be increased. When the electric device is a display, an optical component can be provided between the array structure and the optical structure, and the circuit layer in the array structure can control the optical component. The optical component comprises, for example, a liquid-crystal layer or a diode, but the disclosure is not limited thereto. The above optical structures 10, 20, 30, 40, 50, and 60 can further improve the display quality of the display.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. As long as the features of the various embodiments do not violate or conflict the spirit of the invention, the various embodiments can be mixed and matched arbitrarily. Furthermore, each claim of the present disclosure may be a separate embodiment, and the scope of the present disclosure comprises each claim of the present disclosure and each embodiment in combination with each other.

What is claimed is:

1. An electronic device, comprising:
    a substrate;
    an organic layer disposed on the substrate and comprising a first opening and a second opening;
    a first insulating layer comprising a first portion and a second portion, wherein the first portion is disposed in the first opening and the second portion connects to the first portion and is disposed on the organic layer; and
    a first spacer disposed on the substrate and overlapping the second portion of the first insulating layer,
    wherein, in a top view of the electronic device, the first opening and the second opening are arranged in a first direction, a first virtual line crosses a center of the first spacer and extends in the first direction, the second portion between the first opening and the second opening has a first length, the first spacer has a second length, the organic layer between the first opening and the second opening has a third length, the first length, the second length and the third length are measured along the first virtual line, and the first length is greater than or equal to the second length and less than or equal to the third length.

2. The electronic device as claimed in claim 1, wherein a first distance is between the first spacer and the first opening, a second distance is between the first spacer and the second opening, the first distance and the second distance are measured along the first virtual line, and a ratio of the first distance to the second distance is greater than or equal to 0.7 and less than or equal to 1.3.

3. The electronic device as claimed in claim 1, wherein a first light is emitted from the first opening, a second light is emitted from the second opening, and a color of the first light is different from a color of the second light.

4. The electronic device as claimed in claim 1, wherein the organic layer further comprises a third opening and a fourth opening, and the electronic device further comprises a second spacer disposed on the organic layer,
  wherein, in the top view of the electronic device, the third opening and the fourth opening are arranged in the first direction, and a second virtual line crosses a center of the second spacer,
  wherein a third distance is between the second spacer and the third opening, a fourth distance is between the second spacer and the fourth opening, the third distance and the fourth distance are measured along the second virtual line, and a ratio of the third distance to the fourth distance is greater than or equal to 0.7 and less than or equal to 1.3.

5. The electronic device as claimed in claim 4, wherein a first light is emitted from the first opening, a second light is emitted from the second opening, and the color of the first light is different from the color of the second light.

6. The electronic device as claimed in claim 4, wherein a first light is emitted from the first opening, a third light is emitted from the third opening, and the color of the first light is different from a color of the third light.

7. The electronic device as claimed in claim 6, wherein a second light is emitted from the second opening, and a color of the second light is the same as a color of the third light.

8. The electronic device as claimed in claim 4, wherein the first insulating layer further comprises a third portion and a fourth portion, wherein the third portion is disposed in the third opening and the fourth portion connects to the third portion and is disposed on the organic layer.

9. The electronic device as claimed in claim 8, wherein the first insulating layer further comprises a connecting portion connecting the first portion and the third portion.

10. The electronic device as claimed in claim 8, wherein the second portion is connected to the first portion in a positive direction of the first direction and the fourth portion is connected to the third portion in a negative direction of the first direction.

11. The electronic device as claimed in claim 1, wherein the first insulating layer comprises a fifth portion and a sixth portion, the fifth portion is disposed in the second opening, the sixth portion connects to the fifth portion and is disposed on the organic layer, and a length of the sixth portion measured along the first virtual line is less than the first length.

12. The electronic device as claimed in claim 1, further comprising a second insulating layer disposed between the first insulating layer and the first spacer.

13. The electronic device as claimed in claim 12, further comprising a conductive layer disposed on the second insulating layer.

14. The electronic device as claimed in claim 1, further comprising a second insulating layer comprising a first portion and a second portion, wherein the first portion of the second insulating layer is disposed in the second opening and the second portion of the second insulating layer connects to the first portion of the second insulating layer and is disposed on the organic layer.

15. The electronic device as claimed in claim 1, wherein the first opening and the second opening both have an arc-shaped opening boundary.

* * * * *